(12) United States Patent
Murphy

(10) Patent No.: US 12,731,160 B2
(45) Date of Patent: Sep. 8, 2026

(54) METHOD AND SYSTEM FOR ESTABLISHING DIGITAL IDENTITY IN INTERNATIONAL TRADE

(71) Applicant: MASTERCARD ASIA/PACIFIC PTE. LTD., Singapore (SG)

(72) Inventor: Anthony Paul Murphy, Singapore (SG)

(73) Assignee: MASTERCARD ASIA/PACIFIC PTE. LTD., Singapore (SG)

( * ) Notice: Subject to any disclaimer, the term of this patent is extended or adjusted under 35 U.S.C. 154(b) by 304 days.

(21) Appl. No.: 18/124,278

(22) Filed: Mar. 21, 2023

(65) Prior Publication Data

US 2023/0306443 A1 Sep. 28, 2023

Related U.S. Application Data

(60) Provisional application No. 63/323,620, filed on Mar. 25, 2022.

(51) Int. Cl.
*G06Q 30/018* (2023.01)
*H04L 9/30* (2006.01)
*H04L 9/32* (2006.01)

(52) U.S. Cl.
CPC ......... *G06Q 30/018* (2013.01); *H04L 9/3073* (2013.01); *H04L 9/3247* (2013.01); *G06Q 2220/00* (2013.01)

(58) Field of Classification Search
CPC .............. G06Q 30/018; G06Q 2220/00; H04L 9/3073; H04L 9/3247; H04L 9/40; H04L 2209/56; H04L 9/50; H04L 63/126
See application file for complete search history.

(56) References Cited

U.S. PATENT DOCUMENTS 7,050,990 B1 * 5/2006 Chu .................. G06Q 30/0275 705/37
8,607,332 B2 * 12/2013 Canard ............... G06F 21/6254 726/20
9,058,515 B1 * 6/2015 Amtrup .................. H04N 1/387
10,637,665 B1 * 4/2020 Sundaresan ........... H04L 63/083
(Continued)

FOREIGN PATENT DOCUMENTS

CN 111125734 A * 5/2020 ........... G06F 21/602
WO WO-2022042371 A1 * 3/2022 ............ G06F 21/32

*Primary Examiner* — Jessica Lemieux
*Assistant Examiner* — Emily M. Kraisinger
(74) *Attorney, Agent, or Firm* — Panitch Schwarze Belisario & Nadel LLP

(57) ABSTRACT

A method for establishing a digital identity includes: receiving, by a receiver of a processing server, at least an identification value from a first computing system; identifying, by a processor of the processing server, a verification authority based on the identification value; transmitting, by a transmitter of the processing server, at least the identification value to a second computing system, where the second computing system is associated with the identified verification authority; receiving, by the receiver of the processing server, a positive verification indicating authenticity of the identification value; standardizing, by the processor of the processing server, the identification value; and publishing, by the transmitter of the processing server, the standardized identification value using a third computing system.

14 Claims, 6 Drawing Sheets

(56) References Cited

U.S. PATENT DOCUMENTS

| | | | | |
|---|---|---|---|---|
| 11,693,849 | B2 * | 7/2023 | Tegegne | G06F 16/244<br>707/737 |
| 2015/0304112 | A1 * | 10/2015 | Langman | H04L 63/126<br>713/179 |
| 2018/0101684 | A1 | 4/2018 | Murphy et al. | |
| 2022/0189589 | A1 * | 6/2022 | Ogawa | G16H 50/30 |

* cited by examiner

500

METHOD AND SYSTEM FOR ESTABLISHING DIGITAL IDENTITY IN INTERNATIONAL TRADE

FIELD

The present disclosure relates to the establishing of digital identities for use in international trade, specifically the use of standardization and third party verification of identity data to facilitate business partnerships and data access using such identity data.

BACKGROUND

The creation and widespread use of the Internet has led to people being more connected than any point in human history. The Internet, combined with application programs and webpages to take advantage thereof, often enables individuals to connect with one another over great distances nearly instantly. However, businesses have been largely unable to take advantage of the connectivity of the Internet to find other business partners, particularly because of the lack of available information and the need for a high level of trust that is largely unavailable on the Internet.

As a result, new business relationships, particularly for international business, are often created as the result of networking, where one business is introduced to another through a trusted third party. However, trusted third parties are only available to those businesses that have already fostered a strong relationship with that third party. Additionally, the trusted third party must itself be of sufficient size and experience to have new businesses to introduce to other associates. Such circumstances can be nigh impossible for small and medium enterprises (SMEs), further preventing such enterprises from beneficial growth.

Current solutions to such problems typically require SMEs and other such entities to identify potential new partners through any available means, which can often come without a suitable amount of trust. As a result, these businesses must often utilize various methods and processes for verifying the identity and authenticity of a potential new partner. For many entities, such methods and processes can be prohibitively expensive, which can either prevent the business from obtaining a new partner or prevent the ability of the business to earn a profit from a new relationship. Thus, there is a need for a technologically improved platform that can facilitate new relationships between international businesses, such as through the establishment of digital identities.

SUMMARY

The present disclosure provides a description of systems and methods for establishing a digital identity. An entity wanting to establish a digital identity can transmit one or more identification values to a centralized processing server. The centralized processing server can utilize one or more verification authorities to verify the provided identification values, such as to prove their authenticity and association with the entity. After verification, the centralized processing server can standardize the identification values and then publish the identification values, such as on a blockchain or other suitable storage mechanism. The entity can then present one of the standardized identification values to a potential new business partner to prove their identity and authenticity, or be identified as a potential new business partner via their published identification values. The result is a system that can quickly and easily match businesses and where identities are quickly and easily verified without the need for significant resources or expense by a business. Additionally, the use of such digital identities can also be used to facilitate data access, such as for onboarding an entity on a new business platform in a new location for expansion of services. The result is a system that overcomes the problems with existing solutions with minimal disruption to ongoing business practices.

A method for establishing a digital identity includes: receiving, by a receiver of a processing server, at least an identification value from a first computing system; identifying, by a processor of the processing server, a verification authority based on the identification value; transmitting, by a transmitter of the processing server, at least the identification value to a second computing system, where the second computing system is associated with the identified verification authority; receiving, by the receiver of the processing server, a positive verification indicating authenticity of the identification value; standardizing, by the processor of the processing server, the identification value; and publishing, by the transmitter of the processing server, the standardized identification value using a third computing system.

A system for establishing a digital identity includes: a first computing system; a second computing system; a third computing system; and a processing server, the processing server including a receiver receiving at least an identification value from the first computing system, a processor identifying a verification authority based on the identification value, and a transmitter transmitting at least the identification value to the second computing system, where the second computing system is associated with the identified verification authority, wherein the receiver of the processing server further receives a positive verification indicating authenticity of the identification value, the processor of the processing server standardizes the identification value, and the transmitter of the processing server publishes the standardized identification value using the third computing system.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

System for Establishing and Verifying Digital Identities

Figure 1:
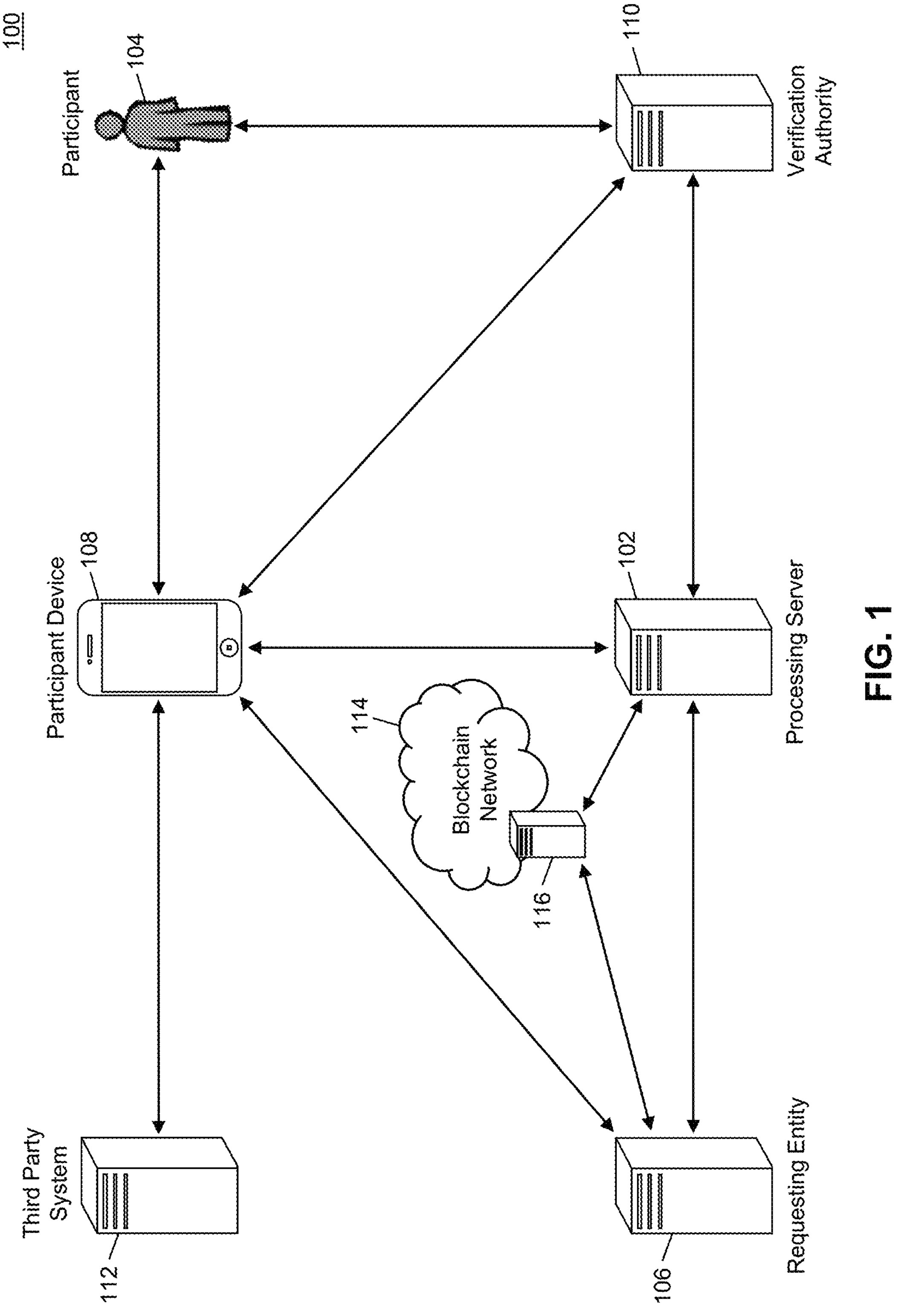
FIG. 1 is a block diagram illustrating a high level system architecture for establishing a digital identity in accordance with exemplary embodiments.

FIG. 1 illustrates a system 100 that facilitates the establishment of digital identities for businesses and other entities and the use of such digital identities for identification of other entities for new relationships, data access, and other benefits.

The system 100 can include a processing server 102. The processing server 102, discussed in more detail below, can serve as a processor for a platform that enables participants 104 to establish digital identities for use in creating and identifying new business relationships, obtaining and managing access to data, and other functions as discussed herein. In the system 100, a participant 104 can be an individual or an entity, such as a business, or can be an individual operating on behalf of an entity.

A participant 104 can interact with the processing server 102 and other computing systems in the system 100 via the use of a participant device 108. The participant device 108 can be a computing device suitable for transmitting and receiving data, displaying data, capturing input, and other functions as discussed herein, such as a suitably programmed desktop computer, laptop computer, notebook computer, tablet computer, cellular phone, smart phone, smart watch, smart television, wearable computing device, implantable computing device, etc. When a participant 104, such as a SME, wants to establish a digital identity, the participant 104 can submit a request to the processing server 102 via their participant device 108. The request can be submitted to the processing server 102 using any suitable communication network and method, such as an application programming interface (API).

Such a request can include one or more set of verifiable identifiers, also referred to herein as "identification values." Each of these identification values can be a data that is associated with a participant 104 used for identification thereof either individually or through the use of multiple other identification values. For instance, an identification value can be a driver's license, corporate charter, business license, name, e-mail address, telephone number, transaction account number, street address, etc., hashes or otherwise encoded versions of an otherwise used identification value or values, or a unique value assigned by the processing server 102. Any value associated with a participant 104 can be used as an identification value, where the values provided by a participant 104 as an identification value can be dependent on the industry, aims of the participant 104, requirements of any applicable regulatory bodies or agencies, etc. For example, a participant 104 that provides construction services in the United States can provide a license number for each state in which the participant 104 is licensed to provide such service, while a rice farmer in rural Liberia can be unable to provide any such identification values. In such cases, the identification values provided by a participant 104 can be determined by the needs of the participant 104 themselves or the market in which the participant 104 is involved. For instance, in the above example, the construction services provider can be interested in providing identification values to prove corporate identity and the range of services provided, while the rice farmer can be interested in providing identification values to prove the quality and size of their crop. Encrypted values can be used for privacy using private and public key pairs, and hashed values can be used for security once a relationship is established.

Once the processing server 102 receives identification values from a participant 104, the processing server 102 can identify one or more verification authorities 110 that can be used to verify the authenticity of the provided identification values and/or their association with the participant 104. A verification authority 110 can be any entity that is capable of and trusted to verify the authenticity of an identification value, which can be dependent on the identification value itself. For instance, if the identification value is a driver's license or other government-issued identification, the governmental agency that issued the identification can serve as the verification authority 110. In another example, if the identification value is a license number or registration number issued by a regulatory agency or other such entity, that agency or entity can serve as the verification authority 110. In yet another example, a trusted participant 104 can serve as a verification authority 110. For instance, in the above example of a rice farmer, a known and trusted multinational business that has had a lengthy relationship purchasing rice from the farmer can act as a verification authority 110 to verify the authenticity of the identification values submitted by the rice farmer. In some cases, multiple entities can serve as a verification authority 110, where verification from a plurality of entities with a lower value of trust can be suitable for a verification equivalent to a single entity with a higher value of trust.

Once the verification authority 110 has been identified for an identification value, the processing server 102 can electronically transmit the associated identification value(s) to the verification authority 110 using a suitable communication network and method. The verification authority 110 can then verify the identification value(s) using any suitable method. A result of the verification (e.g., successful verification or failed verification) can be transmitted back to the processing server 102. If the verification fails, the processing server 102 can electronically transmit a notification message to the participant device 108 indicating that the verification of the identification value(s) failed, and can further prompt the participant 104 to provide additional or alternative identification values.

If the verification is successful, the processing server 102 can then standardize the successfully verified identification values. Standardization can include reformatting, converting, or otherwise modifying the identification values to comply with one or more standards, such as to ensure uniformity among identification values used in the system 100. For example, standardization can include formatting regarding number of digits, capitalization, currency, units of measurement, etc. As an example, driver licenses and other government issued identifications issue around the globe using different formats. One way to standardize this type and other information is to format the information using a header identifying the type of information (e.g., government id (perhaps by subcategory e.g., passport, ID card, driver or other type of license, employee id, etc.) or other type of id), issuing entity (e.g., government jurisdiction, membership organization, business entity, etc.). For example, a driver's licenses might be standardized as follows: DL_USVA_[Identification Value]_T12345678 for a Virginia driver's license and DL_GB_[Identification Value]_1234567812345678, with the underlining showing optional data values. Each of the country codes, identification of the information type and other standardized information could be a 4-16 digit alphanumeric code for example, rather than two digit codes given dependent on the complexity of the information, the desire for additional layers of information and the potential number of records. That is, an example data/signal format would be [Data Type][Issuing Entity][Identification Value][Optional Custom Field][Data from Issuing Entity] as data fields, in one example. The identification value would be a unique alphanumeric value with respect to this process and system. Other formats and standardization protocols are contemplated.

Once the identification values are standardized, they can be published by the processing server 102. Publication of the identification values can include storing the standardized identification values in a database, which can be publicly accessible by any participant 104 in the system 100 or can be private and accessible only by an authorized system, such as the processing server 102. In some cases, some identification values can be stored in a publicly accessible database while other identification values can be stored in a private database. For example, financial information, such as account numbers, can be stored in a private database while license numbers and other less sensitive data can be stored in a public database.

Figure 2:
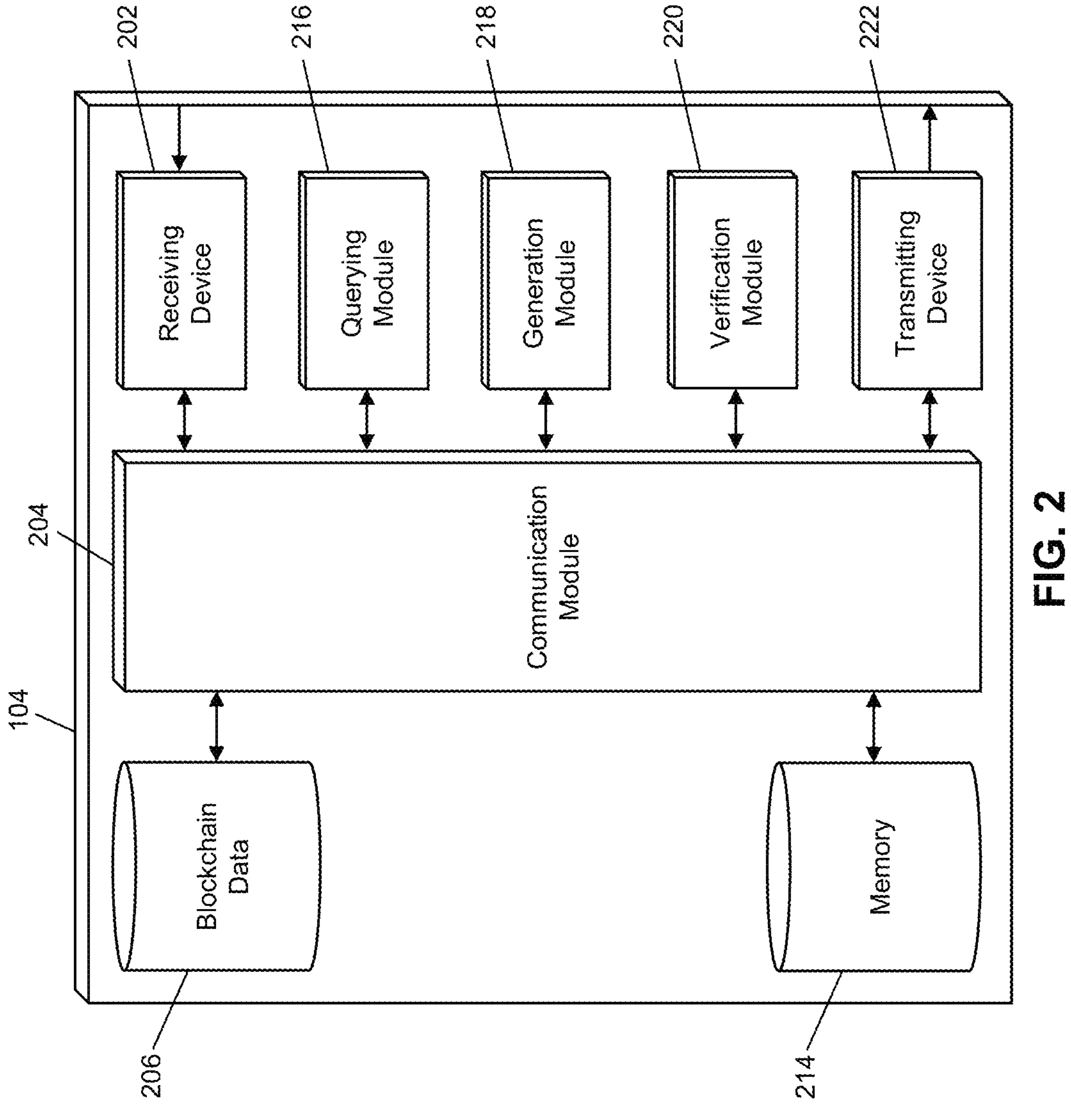
FIG. 2 is a block diagram illustrating a processing server for establishing digital identities in the system of FIG. 1 in accordance with exemplary embodiments.
Figure 6:
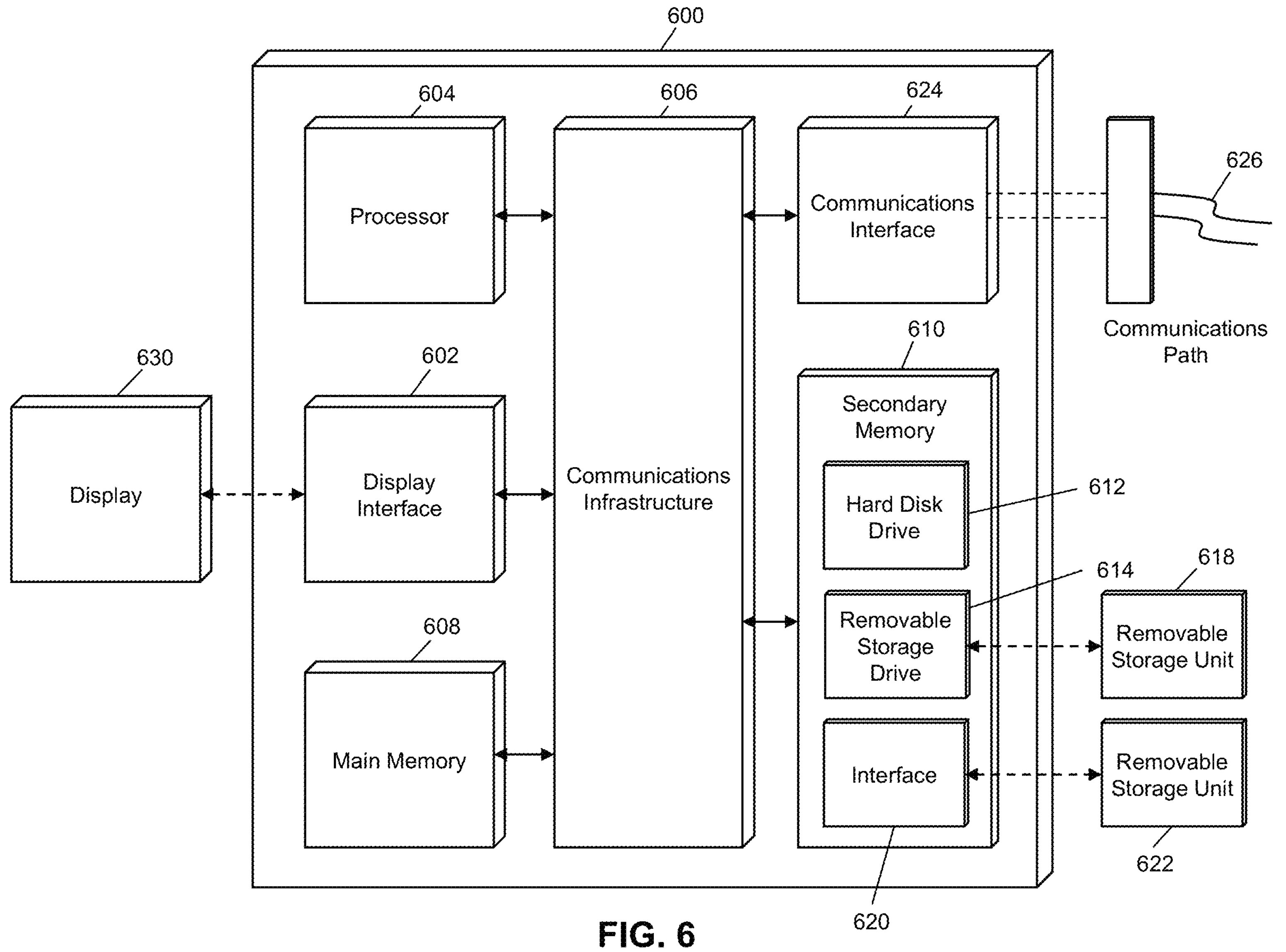
FIG. 6 is a block diagram illustrating a computer system architecture in accordance with exemplary embodiments.

In some embodiments, the system 100 can utilize a blockchain for storing standardized identification values. In such embodiments, the system 100 can include a blockchain network 114. The blockchain network 114 can be comprised of a plurality of blockchain nodes 116. Each blockchain node 116 can be a computing system, such as illustrated in FIG. 2 or 6, discussed in more detail below, that is configured to perform functions related to the processing and management of the blockchain, including the generation of blockchain data values, verification of proposed blockchain transactions, verification of digital signatures, generation of new blocks, validation of new blocks, and maintenance of a copy of the blockchain.

The blockchain can be a distributed ledger that is comprised of at least a plurality of blocks. Each block can include at least a block header and one or more data values. Each block header can include at least a timestamp, a block reference value, and a data reference value. The timestamp can be a time at which the block header was generated, and can be represented using any suitable method (e.g., UNIX timestamp, DateTime, etc.). The block reference value can be a value that references an earlier block (e.g., based on timestamp) in the blockchain. In some embodiments, a block reference value in a block header can be a reference to the block header of the most recently added block prior to the respective block. In an exemplary embodiment, the block reference value can be a hash value generated via the hashing of the block header of the most recently added block. The data reference value can similarly be a reference to the one or more data values stored in the block that includes the block header. In an exemplary embodiment, the data reference value can be a hash value generated via the hashing of the one or more data values. For instance, the block reference value can be the root of a Merkle tree generated using the one or more data values.

The use of the block reference value and data reference value in each block header can result in the blockchain being immutable. Any attempted modification to a data value would require the generation of a new data reference value for that block, which would thereby require the subsequent block's block reference value to be newly generated, further requiring the generation of a new block reference value in every subsequent block. This would have to be performed and updated in every single blockchain node 116 in the blockchain network 114 prior to the generation and addition of a new block to the blockchain in order for the change to be made permanent. Computational and communication limitations can make such a modification exceedingly difficult, if not impossible, thus rendering the blockchain immutable.

In some embodiments, the blockchain can be used to store information regarding blockchain transactions conducted between two different blockchain wallets. A blockchain wallet can include a private key of a cryptographic key pair that is used to generate digital signatures that serve as authorization by a payer for a blockchain transaction, where the digital signature can be verified by the blockchain network 108 using the public key of the cryptographic key pair. In some cases, the term "blockchain wallet" can refer specifically to the private key. In other cases, the term "blockchain wallet" can refer to a computing device (e.g., participant system 106, etc.) that stores the private key for use thereof in blockchain transactions. For instance, each computing device can each have their own private key for respective cryptographic key pairs, and can each be a blockchain wallet for use in transactions with the blockchain associated with the blockchain network. Computing devices can be any type of device suitable to store and utilize a blockchain wallet, such as a desktop computer, laptop computer, notebook computer, tablet computer, cellular phone, smart phone, smart watch, smart television, wearable computing device, implantable computing device, etc.

Each blockchain data value stored in the blockchain can correspond to a blockchain transaction or other storage of data, as applicable. A blockchain transaction can consist of at least: a digital signature of the sender of currency (e.g., a participant device 108) that is generated using the sender's private key, a blockchain address of the recipient of currency (e.g., a requesting entity 106) generated using the recipient's public key, and a blockchain currency amount that is transferred or other data being stored. In some blockchain transactions, the transaction can also include one or more blockchain addresses of the sender where blockchain currency is currently stored (e.g., where the digital signature proves their access to such currency), as well as an address generated using the sender's public key for any change that is to be retained by the sender. Addresses to which cryptographic currency has been sent that can be used in future transactions are referred to as "output" addresses, as each address was previously used to capture output of a prior blockchain transaction, also referred to as "unspent transactions," due to there being currency sent to the address in a prior transaction where that currency is still unspent. In some cases, a blockchain transaction can also include the sender's public key, for use by an entity in validating the transaction. For the traditional processing of a blockchain transaction, such data can be provided to a blockchain node 116 in the blockchain network 114, either by the sender or the recipient. The node can verify the digital signature using the public key in the cryptographic key pair of the sender's wallet or other type of app and also verify the sender's access to the funds (e.g., that the unspent transactions have not yet been spent and were sent to address associated with the sender's wallet) or other information, a process known as "confirmation" of a transaction, and then include the blockchain transaction in a new block. The new block can be validated by other nodes in the blockchain network 114 before being added to the blockchain and distributed to all of the blockchain nodes 116 in the blockchain network 114, respectively, in traditional blockchain implementations. In cases where a blockchain data value cannot be related to a blockchain transaction, but instead the storage of other types of data, blockchain data values can still include or otherwise involve the validation of a digital signature.

In such embodiments, a public blockchain can be used to store standardized identification values. Identification values can be included in one or more blockchain data entries, where each blockchain data entry can include at least one standardized identification value. In some cases, identification values can be encrypted or otherwise obscured prior to storage in a blockchain or other public database. In an example, a standardized identification value can be encrypted using an encryption key, where the participant 104 can provide the encryption key to a requesting entity 106 for decryption of the identification value. In another example, the standardized identification value can be hashed using a one-way hashing algorithm, where the participant 104 can provide the identification value to the requesting entity 106, which can hash the identification value and compare the result to the hashed value stored in the public database for authentication thereof.

In some embodiments, cryptographic keys can be used as tokens for authentication of participants 104 in the system 100 separate from identification values. In such embodiments, each participant 104 can generate a cryptographic key pair using their participant device 108 that includes a private key and a public key. When submitting identification values to the processing server 102, the participant device 108 can generate a digital signature using the private key. The processing server 102 can use the corresponding public key (e.g., provided with the identification value(s) or separately by the participant device 108, such as in a prior submission) to validate the digital signature. The public key can then be published along with the standardized identification values. In such cases, when the participant 104 is providing identification values to a requesting entity 106, the participant 104 can generate a digital signature (e.g., over the provided identification values) using their private key. The requesting entity 106 can identify the public key with the identification values in the database and use the public key to validate the digital signature, which can ensure that the participant 104 that provided them the identification values is the same participant 104 that submitted the identification values initially. In some embodiments, other digital tokens can be used in place of cryptographic keys and digital signatures.

In some embodiments, a participant 104 can be a business or other entity that has multiple employees or other individuals that may utilize identification values associated with the business. In some such embodiments, each individual can have a separate profile (e.g., private key, digital token, etc.) where each individual of the business can have individualized identification values in addition to shared identification values for the business. In other such embodiments, the business can have a profile of identification values and include a sub-profile for each individual that can operate on behalf of the business. In some instances, such profiles or sub-profiles can include identification values that indicate the rights or authorities of the individual to operate on behalf of the business. For instance, one employee can be indicated as authorized to execute contracts on behalf of the business, while another employee can lack such authorization, where the authorization can be indicated via an identification value associated with that employee as a participant 104.

As discussed herein, a profile associated with a business or other entity that includes multiple individuals can be referred to as a corporate digital identity (CDI). Here, a CDI is a specific type of identification value, as discussed above, but is associated with an entity such as a corporation, organization or any other entity that has multiple members (e.g., employees, members, etc.). In other words, a CDI is a specific use to designate the identification value is for a corporation or other from of organization. A CDI can include a plurality of identification values, can manage its own profile, and can manage profiles and rights associated therewith for associated individuals. In some cases, the individuals can manage their own profiles, which can be subject to rules or restrictions set forth by the business using the CDI. A profile for an individual or other participant 104 can be referred to herein as a distributed identifier or decentralized identifier, collectively abbreviated as a "DID." A DID can refer to any subject as determined by the controller of that DID (e.g., the individual, a CDI, a combination thereof, etc.). In some cases, a CDI and/or DID can be split into multiple components, such as a public DID and private DID, where the corresponding identification values are stored in a public or private database, respectively. In some cases, CDI or DID can refer to the identification values associated with a participant 104 or the greater profile that includes the identification values and other data (e.g., public key, available rights, documents, memberships, etc.).

In some embodiments, the system 100 can include one or more third party systems 112. Third party systems 112 can be additional entities and/or computing systems that can provide additional identification values or data associated therewith for inclusion in a DID. For instance, a credit bureau or research firm can be a third party system 112 and can provide additional identification values to help build and populate a profile for a participant 104. In the above example of a rice farmer, the third party system 112 can be an entity that has had a business relationship with the rice farmer that provides information regarding past transactions with the rice farmer as identification values, such as to indicate a quality of the rice farmer's crop or past successful transactions involving the rice farmer to foster new transactions and relationships for the rice farmer. In some cases, any data provided by a third party system 112 may first be verified via a verification authority 110 prior to inclusion in a profile. In some instances, the third party system 112 can be a verification authority 110 where data provided thereby can be considered trusted via the status of the third party system 112 as a verification authority 110 and its associated trust.

In some embodiments, a participant 104 can use their standard identification values as part of an identity verification service provided via the processing server 102. In such an embodiment, the participant 104 can present one or more identification values (e.g., a license number) to a requesting entity 106. The requesting entity 106 can verify that the identification value has been published in the public database (e.g., and further validate an accompanying digital signature or other digital token, as applicable), which can provide the requesting entity 106 with sufficient trust that the license number is genuine and was issued to the participant 104. The requesting entity 106 can then have sufficient trust to establish a new business relationship with the participant 104 without the need to conduct any verifications or authentications itself, by virtue of the system 100, thus enabling a new relationship to be formed with minimal expense of time and resources by the participant 104 and requesting entity 106, which is a vast improvement over traditional systems.

In some embodiments, the system 100 can utilize digital identities for access management. For instance, a participant 104 can be interested in expanding to a new marketplace where membership with a governing body or participation in a regulatory scheme is required. The participant 104 can provide the necessary identification values to the governing body, which can trust the identification values via their publication by the processing server 102, and then provide the participant 104 with membership or access accordingly, resulting in a significantly faster and easier process for both the participant 104 and the governing body. Additionally, the status of the participant 104 with the governing body can be published as a new identification value, submitted by the participant 104 and verified by the governing body, which the participant 104 can provide to requesting entities 106 representing its ability to do business in the new marketplace. Such processes can also be used to facilitate access to documents, data, and other objects through the identification of a participant 104 using identification values.

In cases where one or more identification values can be stored in a private database, the processing server 102 can provide such identification values to a requesting entity 106 with permission from the participant 104. For instance, the construction services provider can apply for a bank loan and provide the bank with public identification values to establish its identity. The bank or the construction services provider can request private identification values associated with the construction services provider to be provided to the bank (e.g., with the construction services provider's approval), which can trust the data as a result of the operation of the system 100, and then use that data in determining to provide a loan to the construction services provider. In some cases, awarding of the loan and relevant terms can be stored in the DID for the participant 104 as new identification values.

In some embodiments, the publishing of identification values can enable two participants 104 to identify each other to establish a new business relationship. In an example, a livestock operation can be in need of rice for feed but lack local relationships or be in an area that lacks rice farms. The livestock operation can review published identification values to identify the rice farmer and trust the publishing of the quality, amount, and availability of rice from the rice farmer and then reach out (e.g., using contact information published as identification values) to the rice farmer to establish a new relationship. This is a significant improvement over traditional systems where the livestock operation would be entirely unaware of the rice farmer without significant networking by one or both of the entities. Conversely, in the system 100, the participation of the rice farmer as a participant 104 enables the creation of a new relationship with the rice farmer without any additional effort beyond supplying its identification values. Additionally, private identification values regarding transaction account data can be used by both the rice farmer and the livestock operation to arrange payment for rice shipments through respective financial institutions, without the livestock operation or rice farmer having to provide the other with possibility sensitive financial data, providing an additional layer of security and convenience for both entities. Thus, the methods and systems discussed herein provide for significant technological improvements over traditional systems involving convenience, efficiency, and data security.

Processing Server

FIG. 2 illustrates an embodiment of a processing server 102. It will be apparent to persons having skill in the relevant art that the embodiment of the processing server 102 illustrated in FIG. 2 is provided as illustration only and cannot be exhaustive to all possible configurations of the processing server 102 suitable for performing the functions as discussed herein. For example, the computer system 600 illustrated in FIG. 6 and discussed in more detail below can be a suitable configuration of the processing server 102. In some cases, additional components of the system 100, such as the participant device 108, requesting entity 106, verification authority 110, and third party system 112 can include the components illustrated in FIG. 2 and discussed below.

The processing server 102 can include a receiving device 202. The receiving device 202 can be configured to receive data over one or more networks via one or more network protocols. In some instances, the receiving device 202 can be configured to receive data from requesting entities 106, participant devices 108, verification authorities 110, third party systems 112, and other systems and entities via one or more communication methods, such as radio frequency, local area networks, wireless area networks, cellular communication networks, Bluetooth, the Internet, etc. In some embodiments, the receiving device 202 can be comprised of multiple devices, such as different receiving devices for receiving data over different networks, such as a first receiving device for receiving data over a local area network and a second receiving device for receiving data via the Internet. The receiving device 202 can receive electronically transmitted data signals, where data can be superimposed or otherwise encoded on the data signal and decoded, parsed, read, or otherwise obtained via receipt of the data signal by the receiving device 202. In some instances, the receiving device 202 can include a parsing module for parsing the received data signal to obtain the data superimposed thereon. For example, the receiving device 202 can include a parser program configured to receive and transform the received data signal into usable input for the functions performed by the processing device to carry out the methods and systems described herein.

The receiving device 202 can be configured to receive data signals electronically transmitted by participant devices 108 that can be superimposed or otherwise encoded with identification values for publishing, which can be accompanied by a digital signature, public key, digital token, or other additional data as discussed herein. The receiving device 202 can also be configured to receive data signals electronically transmitted by requesting entities 106, which can be superimposed or otherwise encoded with identification values, requests for identification values, requests for public keys, etc. The receiving device 202 can be further configured to receive data signals electronically transmitted by verification authorities 110 that can be superimposed or otherwise encoded with verification results, which can also include associated identification values, public keys, digital tokens, or other suitable data. The receiving device 202 can also be configured to receive data signals electronically transmitted by third party systems 112, which can be superimposed or otherwise encoded with identification values and data indicating a participant 104 associated therewith, such as a public key, digital token, other identification values, etc.

The processing server 102 can also include a communication module 204. The communication module 204 can be configured to transmit data between modules, engines, databases, memories, and other components of the processing server 102 for use in performing the functions discussed herein. The communication module 204 can be comprised of one or more communication types and utilize various communication methods for communications within a computing device. For example, the communication module 204 can be comprised of a bus, contact pin connectors, wires, etc. In some embodiments, the communication module 204 can also be configured to communicate between internal components of the processing server 102 and external components of the processing server 102, such as externally connected databases, display devices, input devices, etc. The processing server 102 can also include a processing device. The processing device can be configured to perform the functions of the processing server 102 discussed herein as will be apparent to persons having skill in the relevant art. In some embodiments, the processing device can include and/or be comprised of a plurality of engines and/or modules specially configured to perform one or more functions of the processing device, such as a querying module 216, generation module 218, verification module 220, etc. As used herein, the term "module" can be software or hardware particularly programmed to receive an input, perform one or more processes using the input, and provides an output. The input, output, and processes performed by various modules will be apparent to one skilled in the art based upon the present disclosure.

The processing server 102 can also include blockchain data 206, which may be stored in a memory 214 of the processing server 102 or stored in a separate area within the processing server 102 or accessible thereby. The blockchain data 206 may include a blockchain, which may be comprised of a plurality of blocks and be associated with the blockchain network 114. In some cases, the blockchain data 206 may further include any other data associated with the blockchain and management and performance thereof, such as block generation algorithms, digital signature generation and confirmation algorithms, communication data for blockchain nodes 104, smart contracts, etc. In some cases, the blockchain data 206 can include both a public blockchain and a private blockchain.

The processing server 102 can also include a memory 214. The memory 214 can be configured to store data for use by the processing server 102 in performing the functions discussed herein, such as public and private keys, symmetric keys, etc. The memory 214 can be configured to store data using suitable data formatting methods and schema and can be any suitable type of memory, such as read-only memory, random access memory, etc. The memory 214 can include, for example, encryption keys and algorithms, communication protocols and standards, data formatting standards and protocols, program code for modules and application programs of the processing device, and other data that can be suitable for use by the processing server 102 in the performance of the functions disclosed herein as will be apparent to persons having skill in the relevant art. In some embodiments, the memory 214 can be comprised of or can otherwise include a relational database that utilizes structured query language for the storage, identification, modifying, updating, accessing, etc. of structured data sets stored therein. The memory 214 can be configured to store, for example, cryptographic keys, cryptographic key pairs, encryption algorithms, encryption keys, data formatting rules, signature generation algorithms, standards, public databases, private databases, verification authority 110 data, etc.

The processing server 102 can include a querying module 216. The querying module 216 can be configured to execute queries on databases to identify information. The querying module 216 can receive one or more data values or query strings, and can execute a query string based thereon on an indicated database, such as memory 214 of the processing server 102 to identify information stored therein. The querying module 216 can then output the identified information to an appropriate engine or module of the processing server 102 as necessary. The querying module 216 can, for example, execute a query on the memory 214 to identify a verification authority 110 for use in verifying a received identification value and to identify a standard for use in standardizing the identification value if successfully verified.

The processing server 102 can also include a generation module 218. The generation module 218 can be configured to generate data for use by the processing server 102 in performing the functions discussed herein. The generation module 218 can receive instructions as input, can generate data based on the instructions, and can output the generated data to one or more modules of the processing server 102. For example, the generation module 218 can be configured to generate standardized identification values, generate new profiles, generate notification messages, etc.

The processing server 102 can also include a verification module 220. The verification module 220 can be configured to perform verifications for the processing server 102 as part of the functions discussed herein. The verification module 220 can receive instructions as input, which can also include data to be used in performing a verification, can perform a verification as requested, and can output a result of the verification to another module or engine of the processing server 102. The verification module 220 can, for example, be configured to verify digital signatures using suitable signature generation algorithms and keys, verify hash values by hashing supplied data using a suitable one-way hashing algorithm, verify an entity's right to access requested identification values or other data, etc.

The processing server 102 can also include a transmitting device 222. The transmitting device 222 can be configured to transmit data over one or more networks via one or more network protocols. In some instances, the transmitting device 222 can be configured to transmit data to requesting entities 106, participant devices 108, verification authorities 110, third party systems 112, and other entities via one or more communication methods, local area networks, wireless area networks, cellular communication, Bluetooth, radio frequency, the Internet, etc. In some embodiments, the transmitting device 222 can be comprised of multiple devices, such as different transmitting devices for transmitting data over different networks, such as a first transmitting device for transmitting data over a local area network and a second transmitting device for transmitting data via the Internet. The transmitting device 222 can electronically transmit data signals that have data superimposed that can be parsed by a receiving computing device. In some instances, the transmitting device 222 can include one or more modules for superimposing, encoding, or otherwise formatting data into data signals suitable for transmission.

The transmitting device 222 can be configured to electronically transmit data signals to requesting entities 106, participant devices 108, verification authorities 110, third party systems 112, etc., which can be superimposed or otherwise encoded with standardized identification values, which can be transmitted on their own or as part of a blockchain that is made publicly available in the system 100. The transmitting device 222 can also be configured to electronically transmit data signals to verification authorities 110 that are superimposed or otherwise encoded with identification values for verification, which can be accompanied by other information associated with a corresponding participant 104, such as other identifying data, digital signatures, public keys, digital tokens, etc.

Process for Establishing a Digital Identity

Figure 3:
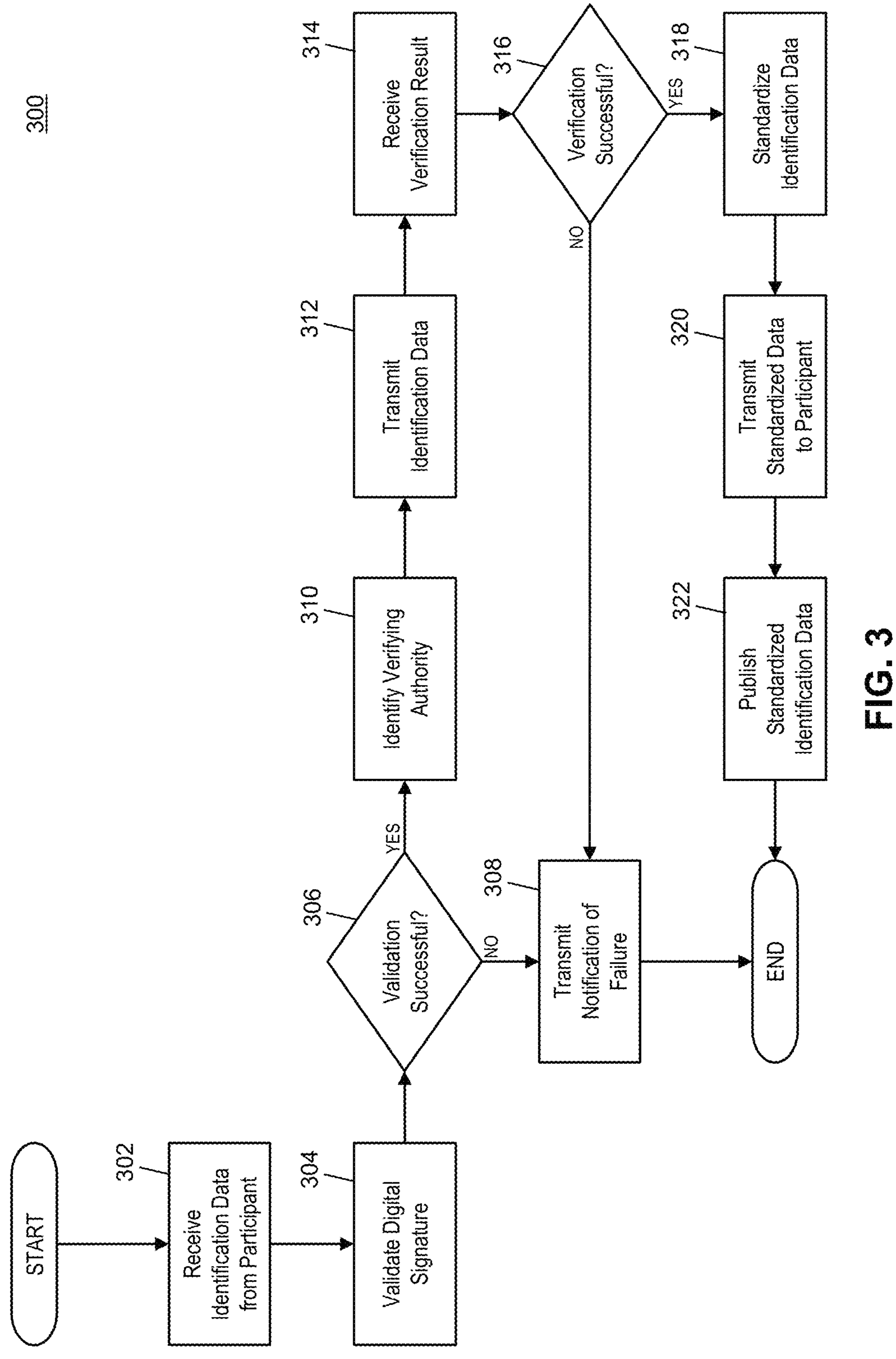
FIG. 3 is a flow diagram illustrating a process for establishing and publishing a digital identity in the system of FIG. 1 in accordance with exemplary embodiments.

FIG. 3 illustrates a process 300 for creating and publishing standardized identification values as part of a digital identity for a participant 104 in the system 100 as performed by the processing server 102.

In step 302, the receiving device 202 of the processing server 102 can receive an identification value from a participant device 108, where the data can be accompanied by a digital signature over the identification value generated via a private key of a cryptographic key pair of the participant device 108 and a public key of the cryptographic key pair. In step 304, the verification module 220 of the processing server 102 can validate the digital signature using the public key. In step 306, the processing server 102 can determine if the validation of the digital signature in step 304 was successful. If the validation was unsuccessful, then, in step 308, the transmitting device 222 of the processing server 102 can electronically transmit a notification message to the participant device 108 using a suitable communication network and method that indicates that the process 300 failed.

If, in step 308, the processing server 102 determines that the digital signature was successfully validated in step 304, then, in step 310, the querying module 216 of the processing server 102 can execute a query on the memory 214 of the processing server 102 to identify a verification authority 110 that can verify the identification value. In some cases, the submission by the participant device 108 can include an indication of the verification authority 110. In some cases, step 310 can then include identifying that the indicated verification authority 110 is suitable to verify the identification value, such as to prevent an attempt at fraud by the participant 104. In step 312, the transmitting device 222 of the processing server 102 can electronically transmit the identification value to the identified verification authority 110 using a suitable communication network and method. In step 314, the receiving device 202 of the processing server 102 can receive a verification result from the verification authority 110.

If the verification result indicates that the verification of the identification value was unsuccessful, then the process 300 can proceed to step 308, where the transmitting device 222 of the processing server 102 can electronically transmit a notification message to the participant device 108 using a suitable communication network and method that indicates that the process 300 failed. If the verification result indicates that the verification of the identification value was successful, then, in step 318, the generation module 218 of the processing server 102 can standardize the identification value according to one or more applicable standards, formatting rules, etc. In step 320, the transmitting device 222 of the processing server 102 can electronically transmit a notification message to the participant device 108 that includes the standardized identification value, which the participant 104 can use when providing the identification value to requesting entities 106. In step 322, the processing server 102 can publish the standardized identification value, such as by transmitting, via the transmitting device 222, the standardized identification value and public key to a blockchain node 116 in the blockchain network 114 for inclusion in a new blockchain data entry.

Process for Verifying a Digital Identity

Figure 4:
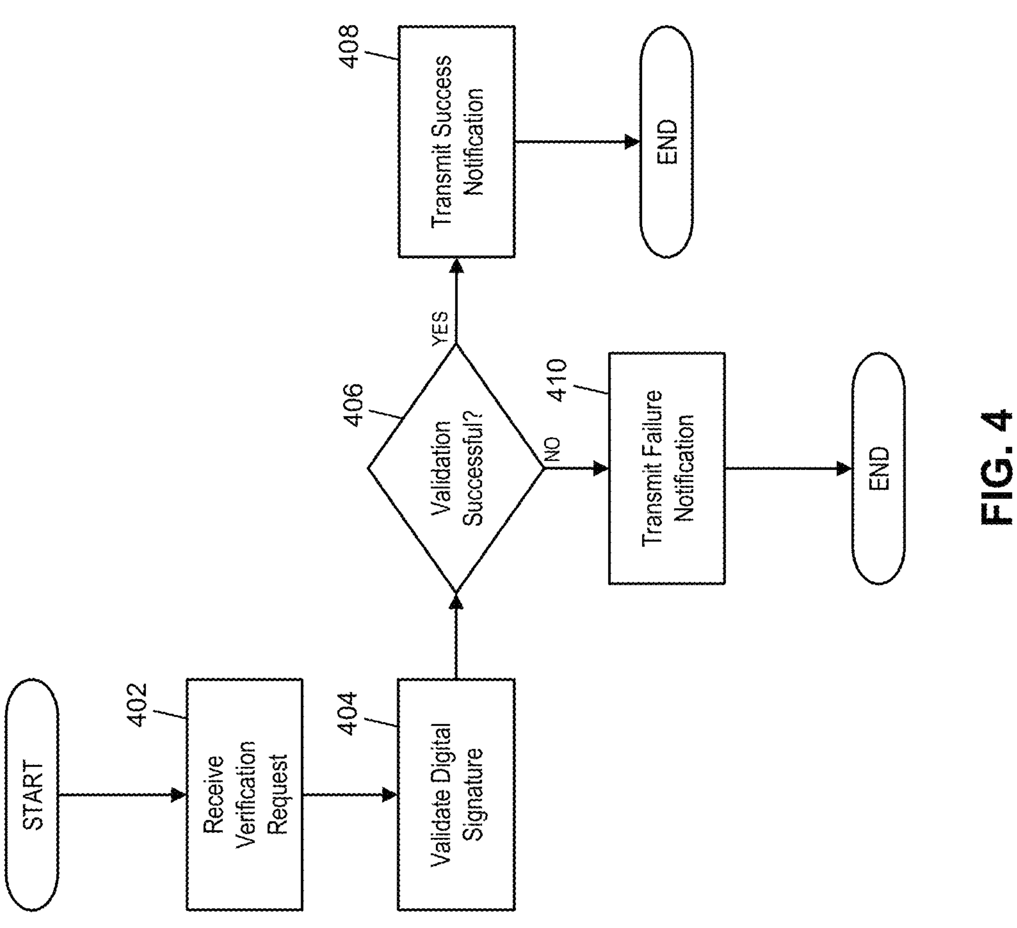
FIG. 4 is a flow diagram illustrating a process for verifying a digital identity in the system of FIG. 1 in accordance with exemplary embodiments.

FIG. 4 illustrates a process 400 for the verification of a digital identity as performed by the processing server 102 in the system 100 in the operation of an identity verification service. It will be apparent to persons having skill in the art that a requesting entity 106 could perform all or a portion of the process 400 to verify a digital identity without having to utilize the processing server 102 by use of the published identification values.

In step 402, the receiving device 202 of the processing server 102 can request a verification request from a requesting entity 106, transmitted to the processing server 102 using a suitable communication network and method. The verification request can include one or more identification values and a digital signature generated over the one or more identification values. In some cases, the verification request can include a public key, and/or can include information to identify a DID for the participant 104 (e.g., in addition to the one or more identification values) that provided the identification value(s) to the requesting entity 106, such as a digital token. In step 404, the verification module 218 of the processing server 102 can validate the digital signature using the public key included in the verification request or identified by the querying module 216 using data included in the verification request.

In step 406, the processing server 102 can determine if the validation of the digital signature in step 404 was successful. If the validation was successful, then, in step 408, the transmitting device 222 of the processing server 102 can electronically transmit a notification message to the requesting entity 106 using a suitable communication network and method that indicates that the validation of the digital signature was successful. The requesting entity 106 can then confidently proceed with establishing a business relationship with the participant 104. If the validation was unsuccessful, then, in step 410, the transmitting device 222 of the processing server 102 can electronically transmit a notification message to the requesting entity 106 using a suitable communication network and method that indicates that the validation of the digital signature failed. The requesting entity 106 can then withhold from trusting the information provided by the participant 104.

In some cases, step 404 can also involve the verification that the one or more identification values were previously published, where the determination in step 406 can be further based on such a verification. In some instances, such a verification can be performed by the requesting entity 106 separate from, or prior to, the process 400.

Exemplary Method for Establishing a Digital Identity

Figure 5:
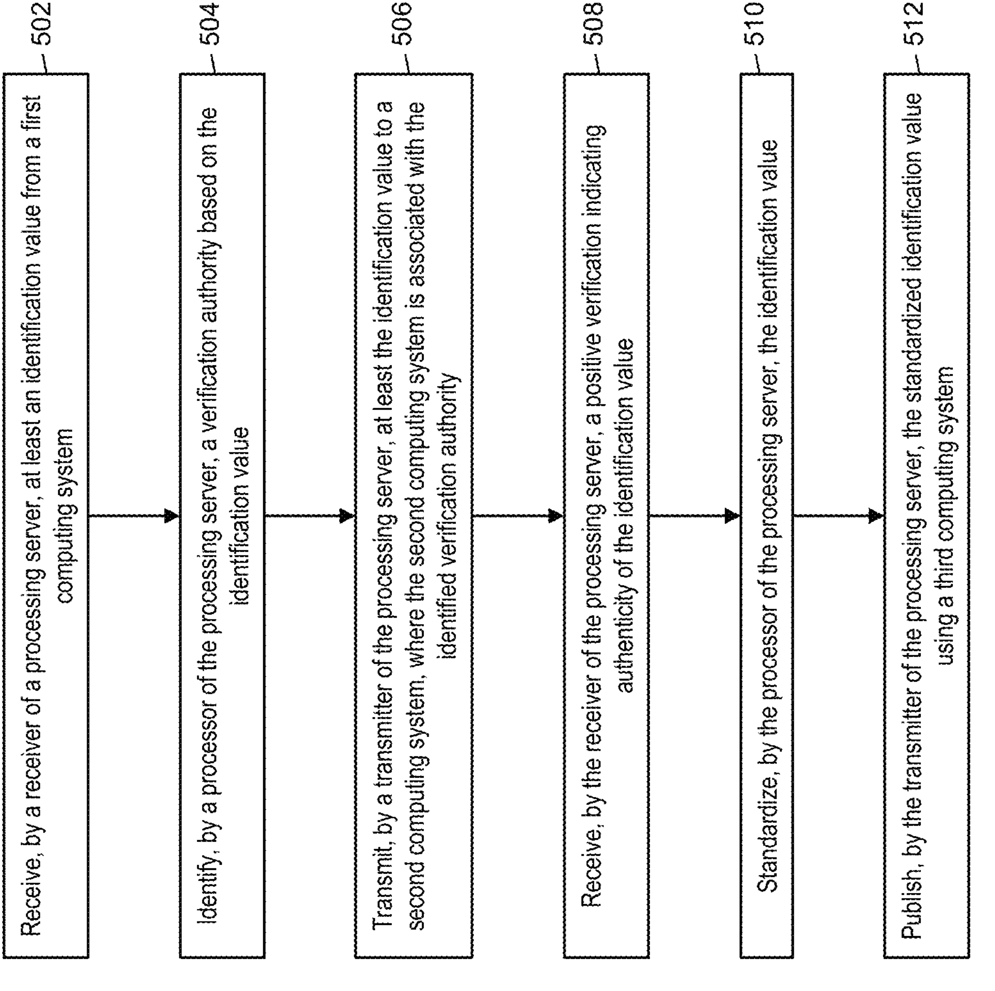
FIG. 5 is a flow chart illustrating an exemplary method for establishing a digital identity in accordance with exemplary embodiments.

FIG. 5 illustrates a method 500 for establishing a digital identity using standardized identification values that are independently verified and then published, such as for identity verification and access management.

In step 502, at least an identification value can be received by a receiver (e.g., receiving device 202) of a processing server (e.g., processing server 102) from a first computing system (e.g., participant device 108). In step 504, a verification authority (e.g., verification authority 210) can be identified by a processor (e.g., querying module 216) of the processing server based on the identification value. In step 506, at least the identification value can be transmitted by a transmitter (e.g., transmitting device 222) of the processing server to a second computing system, where the second computing system is associated with the identified verification authority.

In step 508, a positive verification indicating authenticity of the identification value can be received by the receiver of the processing server. In step 510, the identification value can be standardized by the processor (e.g., generation module 218) of the processing server. In step 512, the standardized identification value can be published by the transmitter of the processing server using a third computing system (e.g., blockchain node 116).

In one embodiment, the method 500 can further include verifying, by the processor (e.g., verification module 220) of the processing server, a digital signature using a public key of a cryptographic key pair, where the digital signature can be received from the first computing system with the identification value, and the digital signature can be successfully verified before publishing the identification value. In a further embodiment, the digital signature can be generated by the first computing system using a private key of the cryptographic key pair. In another further embodiment, the public key can be received from the first computing system with the identification value. In yet another further embodiment, the public key can be published with the standardized identification value.

In some embodiments, the identification value can be published in a blockchain data entry in a block in a blockchain. In one embodiment, the verification authority can be one of: a governmental agency, a non-profit organization, and a multinational corporation. In some embodiments, the method 500 can also include transmitting, by the transmitter of the processing server, the standardized identification value to the first computing system.

Computer System Architecture

FIG. 6 illustrates a computer system 600 in which embodiments of the present disclosure, or portions thereof, can be implemented as computer-readable code. For example, the processing server 102 of FIGS. 1 and 2 can be implemented in the computer system 600 using hardware, non-transitory computer readable media having instructions stored thereon, or a combination thereof and can be implemented in one or more computer systems or other processing systems. Hardware can embody modules and components used to implement the methods of FIGS. 3-5.

If programmable logic is used, such logic can execute on a commercially available processing platform configured by executable software code to become a specific purpose computer or a special purpose device (e.g., programmable logic array, application-specific integrated circuit, etc.). A person having ordinary skill in the art can appreciate that embodiments of the disclosed subject matter can be practiced with various computer system configurations, including multi-core multiprocessor systems, minicomputers, mainframe computers, computers linked or clustered with distributed functions, as well as pervasive or miniature computers that can be embedded into virtually any device. For instance, at least one processor device and a memory can be used to implement the above described embodiments.

A processor unit or device as discussed herein can be a single processor, a plurality of processors, or combinations thereof. Processor devices can have one or more processor "cores." The terms "computer program medium," "non-transitory computer readable medium," and "computer usable medium" as discussed herein are used to generally refer to tangible media such as a removable storage unit 618, a removable storage unit 622, and a hard disk installed in hard disk drive 612.

Various embodiments of the present disclosure are described in terms of this example computer system 600. After reading this description, it will become apparent to a person skilled in the relevant art how to implement the present disclosure using other computer systems and/or computer architectures. Although operations can be described as a sequential process, some of the operations can in fact be performed in parallel, concurrently, and/or in a distributed environment, and with program code stored locally or remotely for access by single or multi-processor machines. In addition, in some embodiments the order of operations can be rearranged without departing from the spirit of the disclosed subject matter.

Processor device 604 can be a special purpose or a general purpose processor device specifically configured to perform the functions discussed herein. The processor device 604 can be connected to a communications infrastructure 606, such as a bus, message queue, network, multi-core message-passing scheme, etc. The network can be any network suitable for performing the functions as disclosed herein and can include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 600 can also include a main memory 608 (e.g., random access memory, read-only memory, etc.), and can also include a secondary memory 610. The secondary memory 610 can include the hard disk drive 612 and a removable storage drive 614, such as a floppy disk drive, a magnetic tape drive, an optical disk drive, a flash memory, etc.

The removable storage drive 614 can read from and/or write to the removable storage unit 618 in a well-known manner. The removable storage unit 618 can include a removable storage media that can be read by and written to by the removable storage drive 614. For example, if the removable storage drive 614 is a floppy disk drive or universal serial bus port, the removable storage unit 618 can be a floppy disk or portable flash drive, respectively. In one embodiment, the removable storage unit 618 can be non-transitory computer readable recording media.

In some embodiments, the secondary memory 610 can include alternative means for allowing computer programs or other instructions to be loaded into the computer system 600, for example, the removable storage unit 622 and an interface 620. Examples of such means can include a program cartridge and cartridge interface (e.g., as found in video game systems), a removable memory chip (e.g., EEPROM, PROM, etc.) and associated socket, and other removable storage units 622 and interfaces 620 as will be apparent to persons having skill in the relevant art.

Data stored in the computer system 600 (e.g., in the main memory 608 and/or the secondary memory 610) can be stored on any type of suitable computer readable media, such as optical storage (e.g., a compact disc, digital versatile disc, Blu-ray disc, etc.) or magnetic tape storage (e.g., a hard disk drive). The data can be configured in any type of suitable database configuration, such as a relational database, a structured query language (SQL) database, a distributed database, an object database, etc. Suitable configurations and storage types will be apparent to persons having skill in the relevant art.

The computer system 600 can also include a communications interface 624. The communications interface 624 can be configured to allow software and data to be transferred between the computer system 600 and external devices. Exemplary communications interfaces 624 can include a modem, a network interface (e.g., an Ethernet card), a communications port, a PCMCIA slot and card, etc. Software and data transferred via the communications interface 624 can be in the form of signals, which can be electronic, electromagnetic, optical, or other signals as will be apparent to persons having skill in the relevant art. The signals can travel via a communications path 626, which can be configured to carry the signals and can be implemented using wire, cable, fiber optics, a phone line, a cellular phone link, a radio frequency link, etc.

The computer system 600 can further include a display interface 602. The display interface 602 can be configured to allow data to be transferred between the computer system 600 and external display 630. Exemplary display interfaces 602 can include high-definition multimedia interface (HDMI), digital visual interface (DVI), video graphics array (VGA), etc. The display 630 can be any suitable type of display for displaying data transmitted via the display interface 602 of the computer system 600, including a cathode ray tube (CRT) display, liquid crystal display (LCD), light-emitting diode (LED) display, capacitive touch display, thin-film transistor (TFT) display, etc.

Computer program medium and computer usable medium can refer to memories, such as the main memory 608 and secondary memory 610, which can be memory semiconductors (e.g., DRAMs, etc.). These computer program products can be means for providing software to the computer system 600. Computer programs (e.g., computer control logic) can be stored in the main memory 608 and/or the secondary memory 610. Computer programs can also be received via the communications interface 624. Such computer programs, when executed, can enable computer system 600 to implement the present methods as discussed herein. In particular, the computer programs, when executed, can enable processor device 604 to implement the methods illustrated by FIGS. 3-5, as discussed herein. Accordingly, such computer programs can represent controllers of the computer system 600. Where the present disclosure is implemented using software, the software can be stored in a computer program product and loaded into the computer system 600 using the removable storage drive 614, interface 620, and hard disk drive 612, or communications interface 624.

The processor device 604 can comprise one or more modules or engines configured to perform the functions of the computer system 600. Each of the modules or engines can be implemented using hardware and, in some instances, can also utilize software, such as corresponding to program code and/or programs stored in the main memory 608 or secondary memory 610. In such instances, program code can be compiled by the processor device 604 (e.g., by a compiling module or engine) prior to execution by the hardware of the computer system 600. For example, the program code can be source code written in a programming language that is translated into a lower level language, such as assembly language or machine code, for execution by the processor device 604 and/or any additional hardware components of the computer system 600. The process of compiling can include the use of lexical analysis, preprocessing, parsing, semantic analysis, syntax-directed translation, code generation, code optimization, and any other techniques that can be suitable for translation of program code into a lower level language suitable for controlling the computer system 600 to perform the functions disclosed herein. It will be apparent to persons having skill in the relevant art that such processes result in the computer system 600 being a specially configured computer system 600 uniquely programmed to perform the functions discussed above.

Techniques consistent with the present disclosure provide, among other features, systems and methods for establishing a digital identity. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or can be acquired from practicing of the disclosure, without departing from the breadth or scope.

What is claimed is:

1. A method for establishing a digital identity within a network system, comprising:

receiving, by a receiver of a processing server, at least an identification value from a first computing system;

identifying, by a processor of the processing server, a verification authority based on the identification value;

transmitting, by a transmitter of the processing server, at least the identification value to a second computing system, where the second computing system is associated with the identified verification authority;

receiving, by the receiver of the processing server, a positive verification indicating authenticity of the identification value;

standardizing, by the processor of the processing server, the identification value, ensuring uniformity among identification values used in the network system, wherein the standardizing includes (i) formatting, by the processor of the processing server, the standardized identification value into a standardized identification data structure including a data type field, an issuing entity field, the identification value as defined data fields, and (ii) partitioning, by the processor of the processing server, the standardized identification data structure into a public portion and a private portion, and encrypting the private portion;

after partitioning the standardized identification data structure, hashing, by the processor of the processing server, the standardized identification value in the standardized identification structure via application of a one-way hashing algorithm thereto; and after hashing the standardized identification value, publishing, by the processing server, the hashed and standardized identification value a to a block of a blockchain in a blockchain node in a blockchain network including a plurality of blockchain nodes, wherein the blockchain node generates the block including a block reference value corresponding to a hash of a previous block header, and a data reference value corresponding to a root of a Merkle tree generated using one or more data values of the block, and wherein modification of the hashed standardized identification value requires regeneration of the data reference and the block reference value in each subsequent block of the blockchain.

2. The method of claim 1, wherein the method further comprises verifying, by the processor of the processing server, a digital signature using a public key of a cryptographic key pair, the digital signature is received from the first computing system with the identification value, and the digital signature is successfully verified before publishing the identification value.

3. The method of claim 2, wherein the digital signature is generated by the first computing system using a private key of the cryptographic key pair.

4. The method of claim 2, wherein the public key is received from the first computing system with the identification value.

5. The method of claim 2, wherein the public key is published with the standardized identification value.

6. The method of claim 1, wherein the verification authority is one of: a governmental agency, a non-profit organization, and a multinational corporation.

7. The method of claim 1, further comprising:

transmitting, by the transmitter of the processing server, the standardized identification value to the first computing system.

8. A network system for establishing a digital identity, comprising:

a first computing system;

a second computing system;

a third computing system; and a processing server, the processing server including a receiver receiving at least an identification value from the first computing system, a processor identifying a verification authority based on the identification value, and a transmitter transmitting at least the identification value to the second computing system, where the second computing system is associated with the identified verification authority, wherein the receiver of the processing server further receives a positive verification indicating authenticity of the identification value, the processor of the processing server standardizes the identification value, wherein said standardizing includes at least one of reformatting, converting and modifying the identification value ensuring uniformity among identification values used in the network system, formats the standardized identification value into a standardized identification data structure including a data type field, an issuing entity field, the identification value as defined data fields;

partitions the standardized identification data structure into a public portion and a private portion, and encrypting the private portion, and after partitioning the standardized identification data structure, hashes the standardized identification value in the standardized identification structure via application of a one-way hashing algorithm thereto, and the transmitter of the processing server publishes the hashed and standardized identification value to a block of a blockchain in a blockchain node in a blockchain network including a plurality of blockchain nodes, wherein the blockchain node generates the block including a block reference value corresponding to a hash of a previous block header, and a data reference value corresponding to a root of a Merkle tree generated using one or more data values of the block, and wherein modification of the hashed standardized identification value requires regeneration of the data reference and the block reference value in each subsequent block of the blockchain.

9. The system of claim 8, wherein the processor of the processing server verifies a digital signature using a public key of a cryptographic key pair, the digital signature is received from the first computing system with the identification value, and the digital signature is successfully verified before publishing the identification value.

10. The system of claim 9, wherein the digital signature is generated by the first computing system using a private key of the cryptographic key pair.

11. The system of claim 9, wherein the public key is received from the first computing system with the identification value.

12. The system of claim 9, wherein the public key is published with the standardized identification value.

13. The system of claim 8, wherein the verification authority is one of: a governmental agency, a non-profit organization, and a multinational corporation.

14. The system of claim 8, wherein the transmitter of the processing server further transmits the standardized identification value to the first computing system.

* * * * *